United States Patent
Coquel et al.

(10) Patent No.: US 11,007,729 B2
(45) Date of Patent: May 18, 2021

(54) LAYING DIE, LAYING DEVICE AND METHOD FOR MANUFACTURING A LAYING DIE

(71) Applicant: Airbus Defence and Space GmbH, Ottobrunn (DE)

(72) Inventors: Maxime Coquel, Munich (DE); Öztzan Akif, Munich (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 10 days.

(21) Appl. No.: 16/583,919

(22) Filed: Sep. 26, 2019

(65) Prior Publication Data
US 2020/0016851 A1   Jan. 16, 2020

Related U.S. Application Data

(62) Division of application No. 14/786,815, filed as application No. PCT/EP2014/001056 on Apr. 22, 2014, now Pat. No. 10,464,269.

(30) Foreign Application Priority Data

Apr. 24, 2013  (EP) .................................. 13290092
Nov. 22, 2013  (EP) .................................. 13005475

(51) Int. Cl.
*B29C 70/38*    (2006.01)
*B29B 13/02*    (2006.01)
(Continued)

(52) U.S. Cl.
CPC .......... *B29C 70/388* (2013.01); *B29B 13/023* (2013.01); *B29C 31/08* (2013.01); *B29C 70/38* (2013.01); *B29B 11/16* (2013.01)

(58) Field of Classification Search
CPC ....... B29C 31/08; B29C 70/38; B29C 70/388; B29C 70/382; B29C 70/384; B29C 70/386

See application file for complete search history.

(56) References Cited

U.S. PATENT DOCUMENTS 2,490,150 A * 12/1949 Newton, Jr. .............. F15B 9/00
                                                    60/368
4,588,466 A *  5/1986 Eaton .................... B29C 70/386
                                                    156/235
(Continued)

FOREIGN PATENT DOCUMENTS

DE    30 03 666 A1    8/1981
DE    196 24 912 A1   1/1997
(Continued)

OTHER PUBLICATIONS

European Search Report for the corresponding European application No. 13005475.2, dated Feb. 12, 2015.
(Continued)

*Primary Examiner* — Seyed Masoud Malekzadeh
(74) *Attorney, Agent, or Firm* — Global IP Counselors, LLP

(57) ABSTRACT

A laying die, for picking up and laying of substrates, comprising an elastically deformable substrate receiving structure providing an engagement surface for releasable receiving of substrates, an attaching element comprising a gas channel for providing positively or negatively pressurized gas for picking up and blowing off the substrates, and a carrier body made from elastically deformable material and sandwiched between the substrate receiving structure and the attaching element which is arranged to distribute the positively or negatively pressurized gas over the carrier body. The carrier body comprises breakthroughs to transfer the pressurized gas from the attaching element to the sub- (Continued)

strate receiving structure that comprises an elastically deformable distribution plate to distribute the positively or negatively pressurized gas over the engagement surface. Also, a laying device which changes the position and/or orientation of substrates to predetermined values can comprise the laying die and a method for manufacturing the laying die.

2 Claims, 14 Drawing Sheets

(51) Int. Cl.
*B29C 31/08* (2006.01)
*B29B 11/16* (2006.01)

(56) References Cited

U.S. PATENT DOCUMENTS

| | | | | |
|---|---|---|---|---|
| 5,176,785 | A * | 1/1993 | Poyet | B29C 70/388 |
| | | | | 156/574 |
| 8,567,469 | B2 * | 10/2013 | Meyer | B29B 11/16 |
| | | | | 156/583.3 |
| 9,370,922 | B1 | 6/2016 | Metschan | |
| 9,718,233 | B2 * | 8/2017 | Karb | B29B 11/16 |
| 9,821,474 | B2 * | 11/2017 | Reinhold | B65H 3/0883 |
| 2007/0215752 | A1 | 9/2007 | Steinkerchner et al. | |
| 2010/0084098 | A1 | 4/2010 | Meyer et al. | |
| 2010/0108252 | A1 * | 5/2010 | Gessler | B65H 51/005 |
| | | | | 156/264 |
| 2012/0328846 | A1 * | 12/2012 | Blot | B29B 11/16 |
| | | | | 428/175 |
| 2013/0174969 | A1 * | 7/2013 | Karb | B29B 11/16 |
| | | | | 156/196 |
| 2014/0103571 | A1 * | 4/2014 | Karb | B29C 70/56 |
| | | | | 264/229 |
| 2015/0314522 | A1 * | 11/2015 | Witzel | B29B 11/16 |
| | | | | 156/166 |

FOREIGN PATENT DOCUMENTS

| | | | |
|---|---|---|---|
| DE | 197 26 831 A1 | 1/1999 | |
| DE | 100 05 202 A1 | 11/2000 | |
| DE | 10 2007 012 068 A1 | 9/2007 | |
| DE | 10 2007 012 609 A1 | 9/2008 | |
| DE | 20 2009 014 155 U1 | 2/2010 | |
| DE | 202009014155 U1 * | 2/2010 | .......... B25J 15/0616 |
| DE | 10 2011 056 029 A1 | 6/2013 | |
| EP | 2 650 109 A1 | 10/2013 | |
| GB | 2490150 A | 10/2012 | |

OTHER PUBLICATIONS

International Search Report for the corresponding international application No. PCT/EP2014/001056, dated Feb. 2, 2015.

* cited by examiner

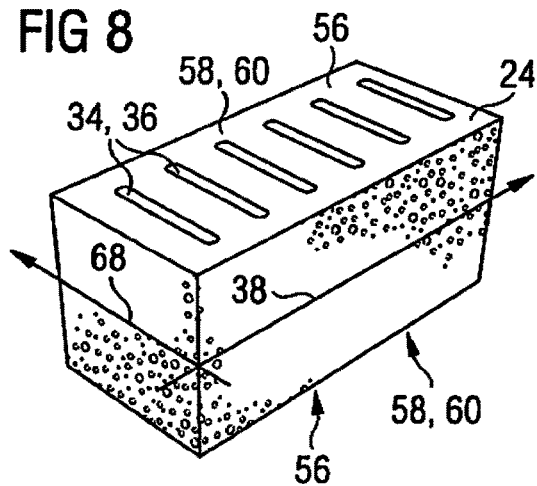
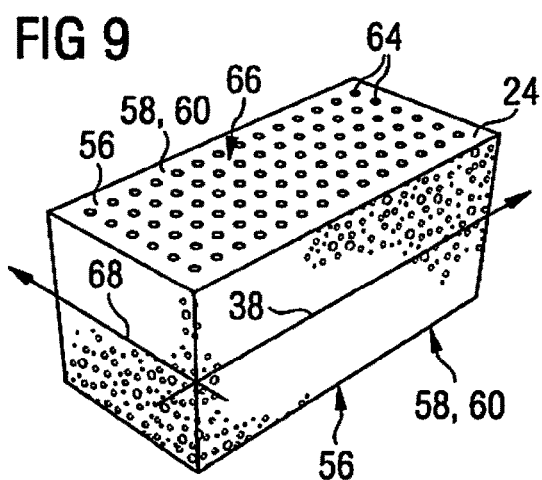
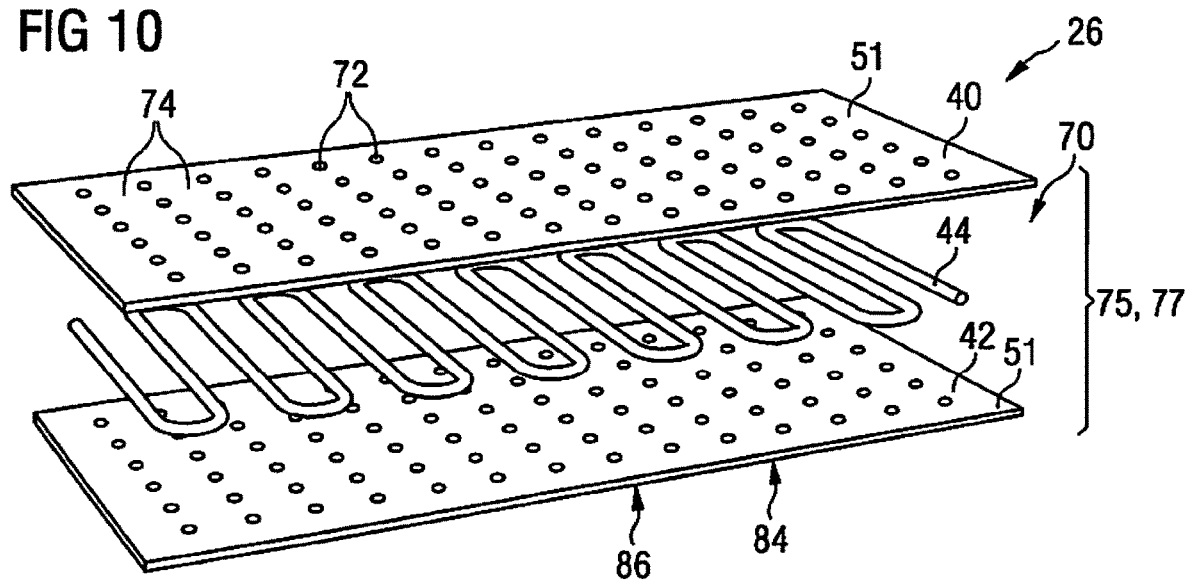

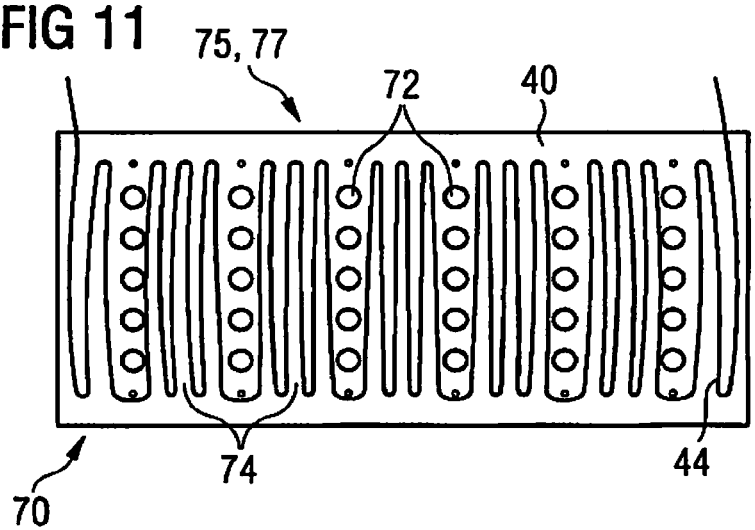
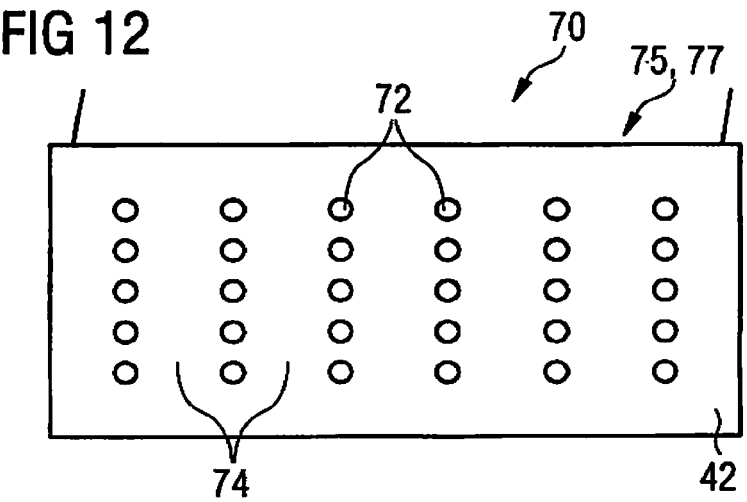

FIG 23  STATE OF THE ART
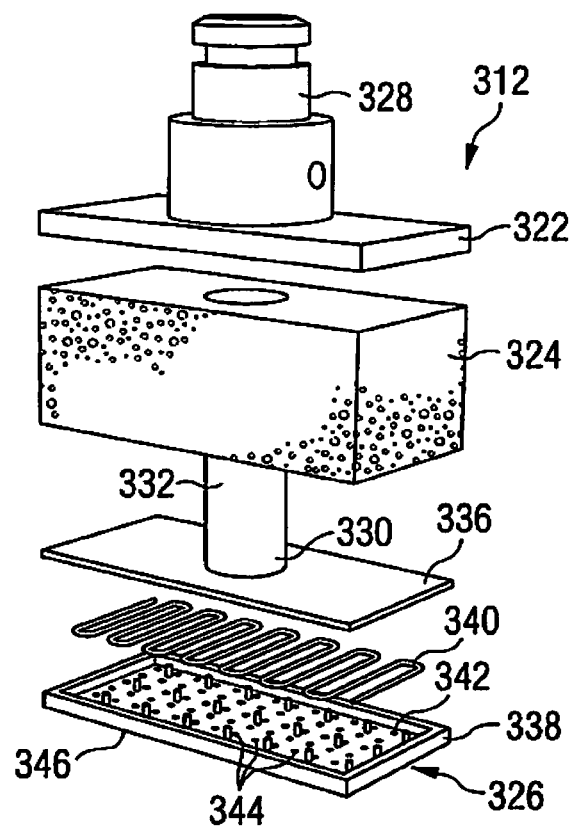

FIG 24 STATE OF THE ART
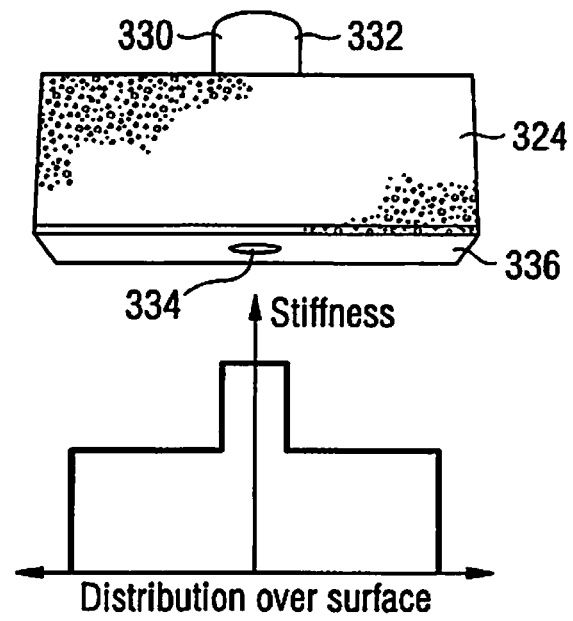
FIG 25 STATE OF THE ART
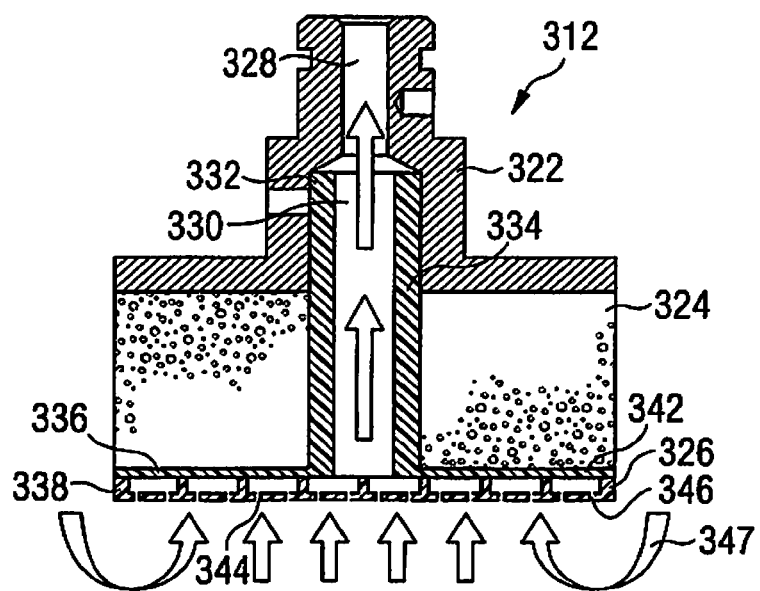

LAYING DIE, LAYING DEVICE AND METHOD FOR MANUFACTURING A LAYING DIE

CROSS-REFERENCE TO RELATED APPLICATIONS

This application is a divisional of U.S. patent application Ser. No. 14/786,815, filed Oct. 23, 2015, now issued as U.S. Pat. No. 10,464,269, which is a U.S. National Stage application of International Application No. PCT/EP2014/001056, filed Apr. 22, 2014, which claims priority to European Patent Application No. 13 290 092.9 filed on Apr. 24, 2013 and European Patent Application No. 13 005 475.2 filed on Nov. 22, 2013, the entire contents of each of which are hereby incorporated herein by reference.

BACKGROUND

Field of the Invention

The invention relates to a laying die for picking up and laying of substrates, a method for manufacturing such a laying die and a laying device comprising the laying die. The laying die and laying device according to the invention are particularly suitable for use in a process of manufacturing a preform for a load path aligned fiber composite structure.

Background Information

At the construction of vehicles of all kinds, particularly at the construction of aircrafts and spacecrafts, but also in other branches of industry such as mechanical engineering, there is an increasing need for strong and yet lightweight, cost-efficient materials. Especially fiber composite materials offer an outstanding lightweight construction potential. The principle resides in the fact that particularly high-strength and stiff fibers are embedded in a matrix in a load path aligned fashion, thus producing components having outstanding mechanical properties by using previous techniques and having a weight which at a comparable performance is typically 25% less than that of aluminum structures and 50% less than steel structures. A drawback is the high material costs and particularly the laborious and mainly manual fabrication.

To produce fiber composite structures with load path aligned fibers, so-called preforms as textile semi-products have been manufactured for selected applications. These are mostly two- or three-dimensional structures having a load path aligned fiber orientation. For this purpose, endless fibers are laid in the direction of the load by using devices from textile engineering and are usually prefixed by sewing, knitting or similar techniques also performed with the aid of devices from textile engineering. Examples of devices and processes for manufacturing such preforms are described in DE 30 03 666 A1, DE 196 24 912, DE 197 26 831 A1 and DE 100 05 202 A1.

However, the known processes for manufacturing preforms are complicated concerning their implementation and process technique. Particularly for components where curved load path lines with a varying density are to be expected, it is not possible with previous processes to manufacture a correspondingly load path aligned component. Particularly, the fibers cannot be oriented arbitrarily along defined curved paths and the fiber content cannot be locally varied.

Therefore, in DE 10 2007 012 609 A1 and DE 10 2007 012 068 A1 a laying device is described, comprising a laying die for laying fiber pieces, the laying die comprising an elastically deformable surface for pressing two-dimensional fiber pieces against a three-dimensional forming surface. This device allows for example the placement of fiber pieces along arbitrary surface geometries, for example even along curved surface structures.

SUMMARY

An object of the invention is to provide an improved laying die and a laying device for picking up and laying of substrates. This object can be attained with a laying die and a method for manufacturing such a laying die as disclosed herein and recited in the claims.

Throughout this document "substrate" comprises all kinds of materials: e.g. cuttings of textiles of any kind, thermoset prepregs, thermoplastic materials and substrates containing fibers; also, any two-dimensional or three-dimensional materials, like film, stickers, packaging, etc. Particularly, the substrates are fiber patches comprising spread fibers of a defined length cut off from a bundle of fiber filaments or fiber band.

A laying die for picking up and laying of substrates according to a disclosed embodiment comprises an elastically deformable substrate receiving structure for providing an engagement surface for releasable receiving of substrates, an attaching element comprising a gas channel for providing positively or negatively pressurized gas for picking up and blowing off the substrates, and a carrier body made from an elastically deformable material. The carrier body is sandwiched between the substrate receiving structure and the attaching element. The attaching element is arranged to distribute the positively or negatively pressurized gas over the carrier body. The carrier body comprises a plurality of breakthroughs to transfer the positively or negatively pressurized gas from the attaching element to the substrate receiving structure and the substrate receiving structure comprises an elastically deformable distribution plate to distribute the positively or negatively pressurized gas over the engagement surface of the substrate receiving structure.

With such an arrangement the following advantages can be attained compared to known laying.

For example, due to the breakthroughs in the carrier body the laying die has a much higher deformability such that picked up substrates can be laid with large deformation and/or camber. In other words, the laying die can easily change its shape and/or adapt to a concave, convex, planar or any other shape of a structure from which the substrates are picked-up from or layed-up on.

The gas distribution takes place between the attaching element and the carrier body and further between the carrier body and the substrate receiving structure. Therefore, a more homogenous vacuum- or blow-off-pulse can be attained at the engagement surface of the substrate receiving structure. Also, a homogeneous vacuum can thus be attained at a structure from which the substrates are picked-up from.

Due to the improved deformability, larger sizes of the die can be used in a manufacturing process in particular to manufacture a load path aligned fiber structure. Due to the preferred even distribution of breakthroughs over the carrier body its deformability is improved over its longitudinal extension. The carrier body has preferably not only improved deformability over its longitudinal extension direction but also over its extension direction in depth.

Preferably the carrier body and/or the substrate receiving structure has a planar shape in its non-deformed state. The carrier body and/or the substrate receiving structure deform according to the shape of the tool on which the substrates are layed-up, e.g. a preform mold, or picked-up from, e.g. a delivery system. Due to the deformability of the carrier body and/or the substrate receiving structure, a three-dimensional deformation of the substrates attached to the laying die can be attained.

In an embodiment the breakthroughs are evenly distributed over a longitudinal extension direction of the carrier body, and are in particular formed as slits extending perpendicular to the longitudinal extension direction of the carrier body. In an alternative embodiment the breakthroughs are formed as circles arranged in a matrix with more than two rows and two columns.

In another embodiment wall surfaces of the breakthroughs and/or the carrier body surfaces at least partially comprise air-tight seals, in particular formed with a glue or a silicon film glued or a thermoplastic film melted to the wall surfaces and/or the carrier body surfaces. When the wall surfaces of the breakthroughs are preferably air-tight the vacuum or gas pressure provided by the attaching element can preferably be almost loss-free transported to the substrate receiving structure.

In a further embodiment the attaching element comprises a base plate with projections being in contact with the border areas of the carrier body in order to form an hollow space between the base plate and the carrier body, the hollow space in particular extending over all breakthroughs of the carrier body such that a vacuum or a gas can preferably be evenly distributed over the carrier body. The gas channel of the attaching element comprises preferably at least one connecting part to connect a vacuum pipe and/or a gas pressure pipe to the gas channel.

In a further embodiment the gas channel comprises several gas pipes being arranged symmetrically around the centre of the base plate to evenly distribute the vacuum or gas into the hollow space. In another embodiment the attaching element is formed with a metal, in particular with a light metal or is formed with a composite sandwich construction, in particular a carbon fiber reinforced polymer-(CFRP)skin with a Nomex® honeycomb core.

Preferably, the carrier body is formed with a foamed material, in particular with a foamed plastic, in particular with polyurethane foam, or is formed with silicon. The distribution plate can comprise an elastically deformable film, in particular a silicon film, which comprises evenly distributed holes, the distribution plate in particular comprising a heating element. Providing an elastically deformable film silicon mats preferably improves the overall deformability of the laying die and therefore enables larger deformation of the substrates. The preferred even distribution of the holes over the surface of the distribution plate enables a preferred evenly distribution of vacuum or pressurized gas at the engagement surface of the laying die. If a heating element is provided the substrates can preferably be heated during transport with the laying die and therefore a binding material which is possibly present on the substrates can be activated.

In another embodiment the distribution plate comprises a sandwich structure of two stacked elastically deformable films with correspondingly arranged holes, wherein the heating element is arranged in between the two films. Preferably, the heating element is glued between the two films, in particular is glued with deformable silicon glue. Preferably, the heating element is arranged on an inner surface of the distribution plate. More preferably, the heating element is formed with a heating fiber, in particular a heating fiber formed from steel filaments, and is in particular evenly arranged on bar links between the holes of the film. In an alternative embodiment, the heating element is formed with a coating, in particular a graphite coating, on the inner surface of the film, wherein the film in particular comprises metal contact stripes to electrically contact the coating.

When using a heating element made from a metal like steel the heating element is preferably less unstable and the likelihood of the heating element breaking during cambering preferably is less than when brittle carbon fiber is used as the heating element. Further, when using a metal a higher heating temperature can be preferably attained, in particular higher than 80° C.

The manufacturing process to manufacture the distribution plate is preferably simplified if two elastically deformable films are stacked, wherein the heating element is arranged in between, and the holes are inserted into the stack assembly as a whole instead of using pre-perforated mats and introducing the heating element in a complicated laying process. In an embodiment a cambering device is provided to actively deform the carrier body and/or the substrate receiving structure according to a predetermined deformation after substrates have been picked up by the laying die. The preferred cambering device is able to preferably actively deform either the carrier body or the substrate receiving structure alone or the two elements together such that substrates which are picked up at the engagement surface can preferably be deformed to a predetermined deformation without using additional tooling.

In another embodiment the cambering device comprises at least one rope system, the rope system comprising a rope to pull the carrier body and/or the substrate receiving structure into the predetermined camber. Preferably, the rope is in contact with the carrier body and/or the substrate receiving structure. The rope system can further comprise a bobbin to wind the rope, and a motor, in particular a linear motor, to drive the bobbin, the bobbin and the motor being in particular arranged at the attaching element.

The preferred rope of the rope system can preferably be attached to the carrier body or to the substrate receiving structure such that when the rope is shortened, for example by winding it up using the bobbin, also the carrier body is shortened in the area of the rope thereby cambering the carrier body and the substrate receiving structure and the engagement surface. The rope can be arranged in the breakthroughs of the carrier body, the breakthroughs of the carrier body in particular being adapted to concentrate a negative pressure in the area of lateral edges of the carrier body.

If the negative pressure, i.e. the vacuum, can preferably be concentrated in the area of lateral edges, i.e. in the area of the outermost breakthroughs in the carrier body, a substrate can be preferably easily deformed as the vacuum grip is preferably higher at the end of the substrates to be formed. Preferably the rope is arranged rectangular parallel to lateral edges of the carrier body, wherein the rope system in particular comprises an idler pulley to guide the rope, the idler pulley and the bobbin preferably being arranged at vicinal edges of the attaching element. The rope can be formed with steel fiber yarn. In another embodiment two rope systems are provided at opposing edges of the attaching element.

In a further embodiment the deformation of the carrier body is achieved by a gas or vacuum system, and the walls of the breakthroughs of the carrier body can be sealed or a membrane can be inserted in order to create a sealed air chamber. Also the external surfaces of the carrier body can be sealed to apply positive or negative air pressure to the carrier body. The gas pressure can be applied in all or some of the sealed breakthroughs. Different gas pressure, i.e. positive and or negative or a combination therefrom, can be applied to the different sealed breakthroughs and or the carrier body.

In another embodiment the deformation of the carrier body is achieved by a pin system which can be inserted in the carrier body to locally control the height of the die. The deformation of the carrier body can be achieved by pulling some planar material partially glued to the lateral external surfaces of the carrier body and that can be pulled to modify locally the height of the die.

The actively deformation of the laying die can be achieved by the rope, gas or pin system described above or a combination therefrom. These active deformation systems can be integrated in the die, so that the die can be deformed to any desired shape. The desired deformation of any part of the die can be controlled separately and be deformed to a different value.

A laying device can comprise a laying die for picking up and laying of substrates according to predefined positions and orientations. The laying die is as described above. The substrates are picked-up or layed-up on a tool or plurality of tools. In some embodiments the laying device can be static and a moving tool or plurality of moving tools are provided, so that the substrates are picked-up from or layed-up on the tool(s).

In another embodiment the laying device is adapted to move the laying die in at least two spatial directions, preferably in three spatial directions, and/or to rotate the laying die, preferably up to 360°, around an axis intersecting an upper surface of the attaching element, and/or to pivot the laying die, preferably up to 360°, around an axis being parallel to the upper surface of the attaching element, the laying device in particular comprising a robot arm. The laying die can be mounted on any kind of laying device, e.g. 6-axes robot, delta robot, scara robot or any other kind of robot depending on the desired application.

The substrates can be provided by a delivery system, such as a running belt, a stack of substrates or any other delivery system, allowing to subsequently pick up the substrates from a defined position. The substrate delivery system could be integrated with the laying die to form one unit, so that the substrate is directly placed on the substrate receiving structure. With this arrangement the substrates can be laid down along predetermined curved structures thereby providing a work piece with the fibers preferably being arranged along predetermined load paths.

In another embodiment a control device is provided to control movement and/or rotation and/or pivoting of the laying device, the control device in particular comprising a storage device to store predetermined values of the position and/or orientation of the substrates, and an activation device to activate movement and/or rotation and/or pivoting of the laying die. In the storage device it is preferably stored how the substrates have to be laid down onto a work piece in order to manufacture a preferred load path aligned fiber structure wherein not only the direction of the fibers but also the deformation of the fibers is preferably stored. The storage device preferably is able to send signals to the activation device such that the activation device can preferably activate the movement of the for example robot arm in order to attain the laying of the substrates in the predetermined fashion. The control device can be provided to control the cambering device based on predetermined cambering values stored in the storage device.

The laying die as described above can perform several actions: picking up the substrate, laying the substrate, optionally heating the substrate if the laying die comprises a heating element, drape the substrate, and shape the laying die to a desired and/or predefined form of the substrate. A combination of the mentioned actions or all actions could be performed in any order: e.g. the laying die can deform its shape to adapt to a three-dimensional tool on which the substrate is provided, picking up and laying the substrate by releasing the substrate from the substrate receiving structure of the laying die, and optionally heating the substrate for thermal activation; also picking up a two-dimensional substrate, optionally heating the substrate, draping and laying the substrate by releasing the substrate from the substrate receiving structure, optionally before laying the substrate deforming the shape of the laying die and/or substrate receiving structure to provide the desired deformation of the substrate.

In an application, the laying device provided with the laying die lays up the substrate on a tool, e.g. mold or plate. Optionally the tool on which the substrate is layed-up is mounted on a robot as described above.

In a method for manufacturing the laying die described above, the following operations can be performed:

a) providing an elastically deformable substrate receiving structure with an elastically deformable distribution plate;

b) providing a carrier body made from an elastically deformable material;

c) providing an attaching element comprising a gas channel;

d) distributing a plurality of breakthroughs into the carrier body; and e) sandwiching the carrier body between the substrate receiving structure and the attaching element.

In another embodiment the method comprises the following operations:

a1) providing two elastically deformable films;

a2) arranging an heating element between the two films to provide a stack; and a3) distributing a plurality of holes into the stack.

In a further embodiment of the method the breakthroughs in operation d) are preferably formed by drilling, cutting by a laser, cutting by a knife, cutting by a water jet and/or burning into the carrier body.

BRIEF DESCRIPTION OF THE DRAWINGS

Embodiments of the invention will be described in more detail by way of the attached drawings, in which:

FIG. 8 illustrates breakthroughs in the carrier body formed as slits;

FIG. 9 illustrates breakthroughs in the carrier body formed as a hole matrix;

FIG. 10 shows the assembly of the substrate receiving structure out of two films and a sandwiched heating element;

FIG. 11 shows a backside view of the substrate receiving structure;

FIG. 12 shows a front side view of the substrate receiving structure;

FIG. 23 shows an exploded view of a laying die according to the state of the art comprising an attaching element, a carrier body and a substrate receiving structure;

FIG. 24 illustrates the carrier body of FIG. 23 with a corresponding stiffness distribution; and FIG. 25 shows a gas flow through the laying die of FIG. 23.

DETAILED DESCRIPTION OF EMBODIMENTS

Figure 1:
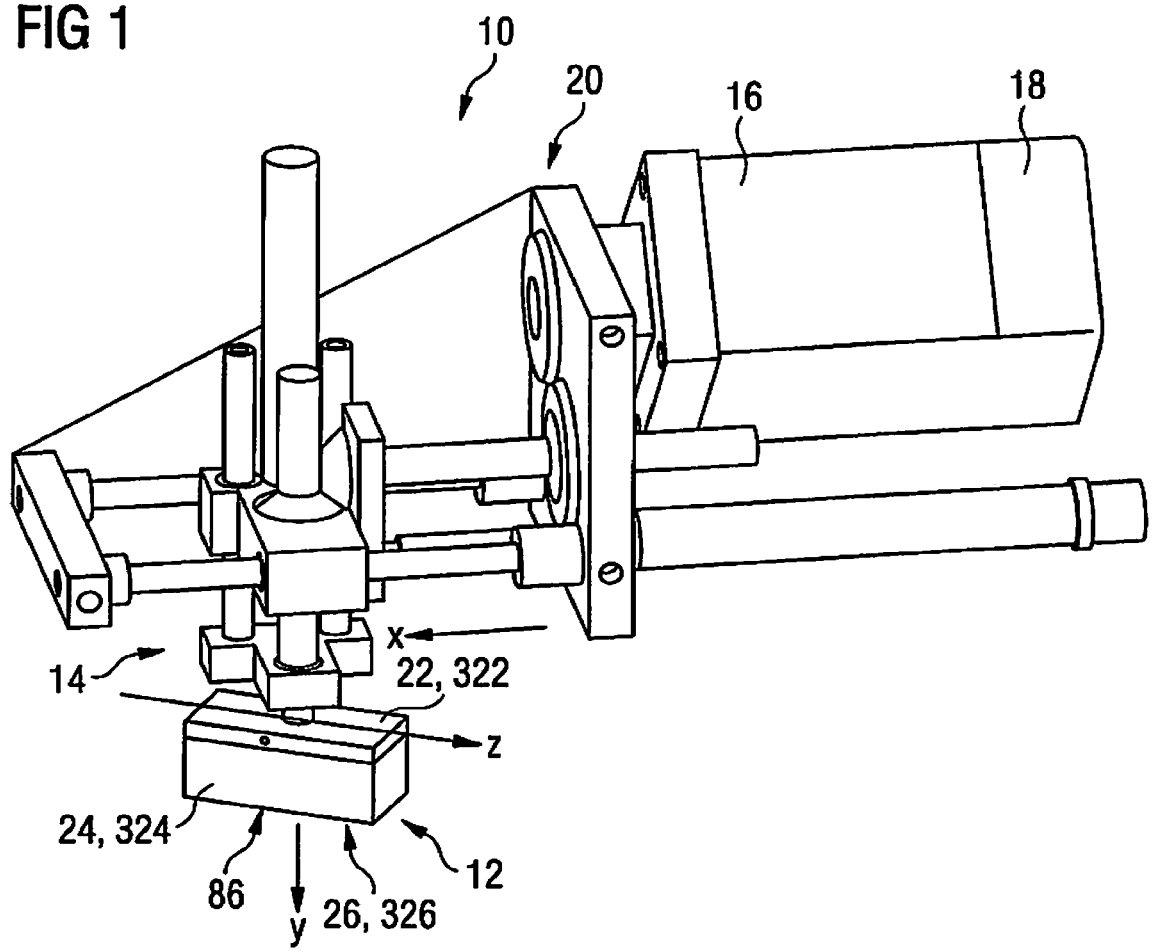
FIG. 1 illustrates a laying device comprising a laying die for picking up and laying of substrates.

FIG. 1 shows a laying device 10 for laying of fiber pieces, the device 10 comprising a laying die 12, the laying device 10 being able to moving the laying die 12 in two spatial directions x, y and to rotate the laying die 12 around axis y. Further, the laying device 10 is able to pivot the laying die 12 around axis z.

To be able to move, rotate and pivot the laying die 12 the laying device 10 comprises a robot arm 14. Further, a control device 16 is provided to control the robot arm 14. The control device 16 comprises a storage device 18 in which predetermined values of the position, orientation and/or camber of the fiber pieces to be attained are stored. The storage device 18 is communicating with an activation device 20 which activates the robot arm 14 according to the values to be attained.

FIG. 23 to FIG. 25 show a laying die 12 according to the state of the art. The conventional laying die 312 comprises an attaching element 322, a carrier body 324 and a substrate receiving structure 326 as shown in the exploded view of FIG. 23. The attaching element 322 comprises a gas channel 328 through which a negatively or positively pressurized gas can be provided to the substrate receiving structure 326. The gas channel 328 communicates with a silicon gas channel 330 provided by a pipe 332 which is embedded in a central breakthrough 334 formed in the carrier body 324. At its lower end the silicon gas channel 330 comprises a silicon distribution plate 336 being integrally formed with the pipe 332. The substrate receiving structure 326 is formed by a silicon mat 338 with an integrated heating element 340 made from carbon fiber.

When substrates have to be picked up by the laying die 312, i.e. by using negatively pressurized gas flow, a vacuum is attached to gas channel 328 and supplied via pipe 332 and the silicon distribution plate 336 over the inner surface 342 of the substrate receiving structure 326. As the substrate receiving structure 326 comprises evenly distributed holes 344, the vacuum is also distributed over the engagement surface 346 of the substrate receiving structure 326. Due to this vacuum at the engagement surface 346 a substrate which is located nearby the outer surface 346 will be attached to the substrate receiving structure 326 and can be transported via the laying device 10 to a predetermined position.

FIG. 24 shows that due to the central breakthrough 334 in the carrier body 324 the stiffness is not evenly distributed over the carrier body 324, but has higher values in the area of the central breakthrough 334. FIG. 25 shows how the vacuum attached to the gas channel 328 transports gas 347 from outside the laying die 312 through the substrate receiving structure 326, the silicon gas channel 330 and the gas channel 328.

Figure 2:
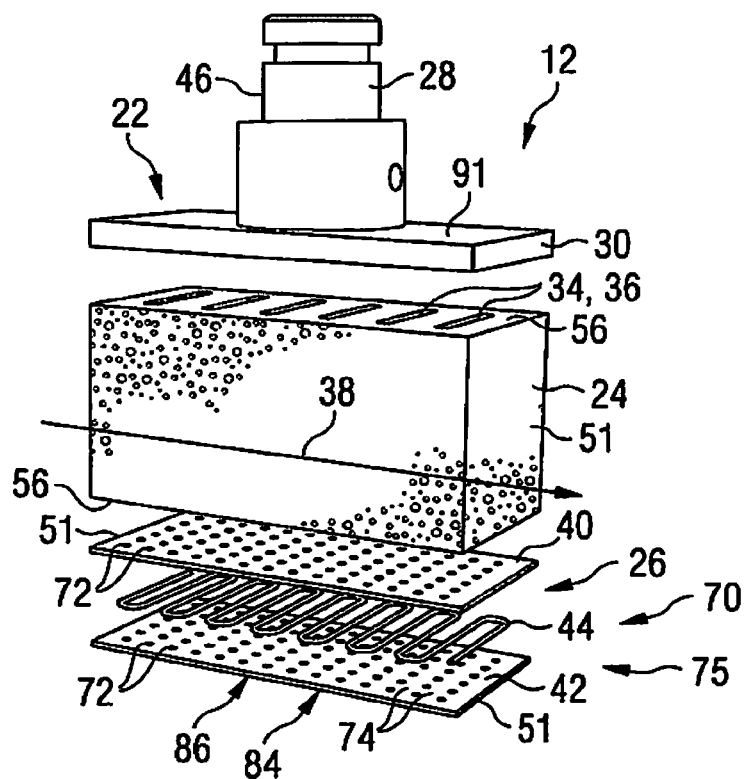
FIG. 2 is an exploded view of the laying die of FIG. 1, comprising an attaching element, a carrier body and a substrate receiving structure.

FIGS. 2 to 22 show embodiments of the laying die 12 according to the invention. In FIG. 2 is shown that the laying die 12 comprises an attaching element 22, a carrier body 24 and a substrate receiving structure 26. The attaching element 22 comprises a pipe element 28 and a base plate 30 integrally formed with the pipe element 28. The carrier body 24 comprises breakthroughs 34 in the form of slits 36 which are distributed over a longitudinal extension direction 38 of the carrier body 24. The substrate receiving structure 26 comprises separate films 40, 42 and a heating element 44 being sandwiched between the two films 40, 42.

Figure 3:
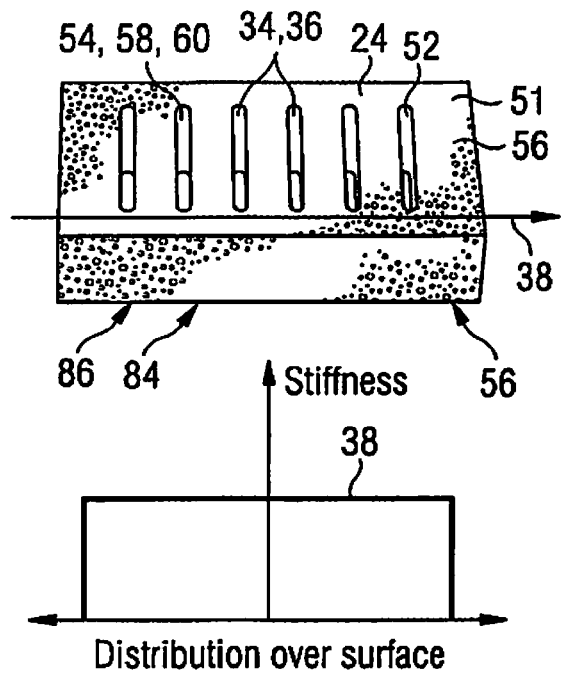
FIG. 3 shows the carrier body of FIG. 2 together with a stiffness distribution over the surface of the carrier body.

FIG. 3 shows the stiffness distribution over the carrier body 24 resulting from the slits 36 being evenly distributed over the longitudinal extension direction 38 of the carrier body 24. As can be seen, different to the carrier body 324 of the state of the art, the stiffness of the carrier body 24 is evenly distributed over its overall extension direction 38.

Figure 4:
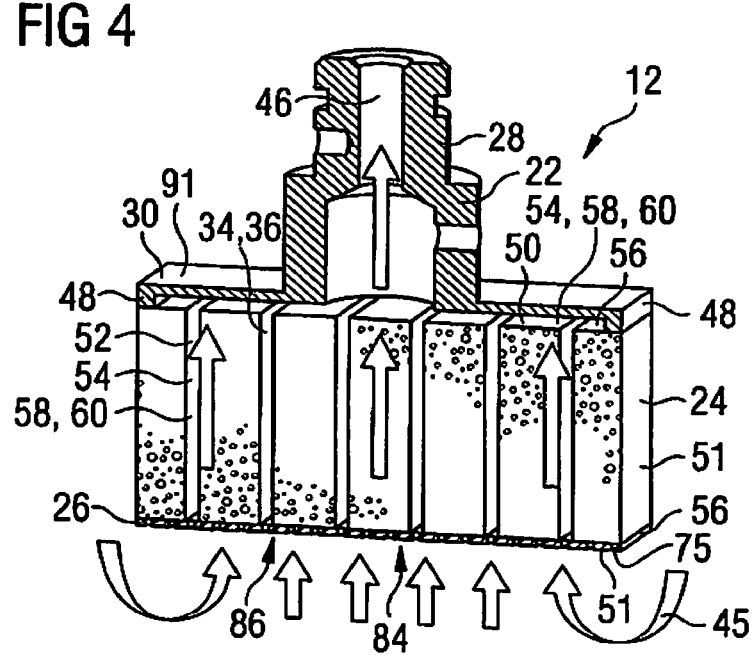
FIG. 4 illustrates a gas flow through the laying die of FIG. 1.

FIG. 4 shows a gas flow through the laying device 12, wherein a gas 45 is not only transported through a central breakthrough 334 as shown in FIG. 25 in the state of the art, but is divided over all breakthroughs 34 and therefore evenly distributed in the carrier body 24. As further can be seen the pipe element 28 is formed to provide a gas channel 46, wherein the base plate 30 is only in contact with the outer edges 48 of the carrier body 24 thereby providing a hollow space 50 between the attaching element 22 and the carrier body 24. When providing a positively pressurized gas flow through the gas channel 46 to the substrate receiving structure 26 the gas 45 is evenly distributed over the breakthroughs 34 due to this hollow space 50.

Figure 5:
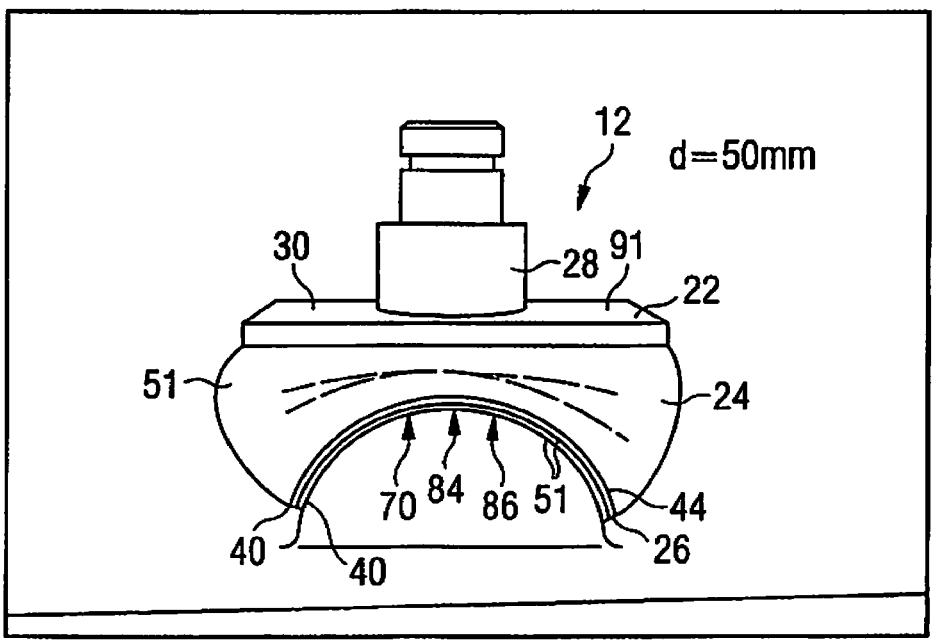
FIG. 5 shows the laying die of FIG. 1 being cambered around a curved surface.
Figure 6:
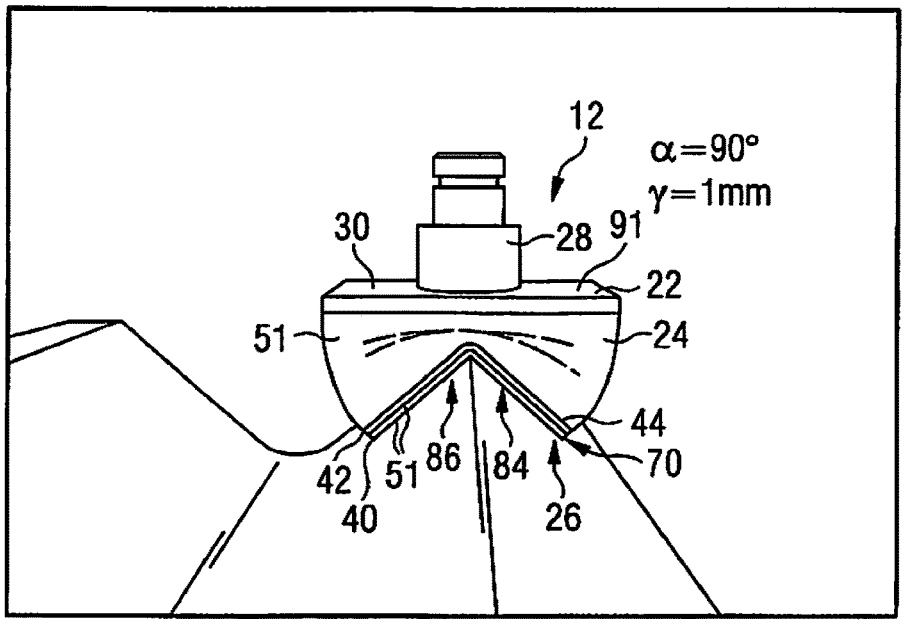
FIG. 6 shows the laying die of FIG. 1 being flexed over an angled surface.

The carrier body 24 and the substrate receiving structure 26 are formed from an elastically deformable material 51 and are therefore elastically deformable. Due to the even stiffness distribution over the whole longitudinal extension direction 38 the laying die 12 can more excessive be deformed around bent surfaces. For example, in FIG. 5 is shown that the laying die 12 can be cambered around a cambered surface with a diameter of 50 millimetres. Further, as shown in FIG. 6 the laying die 12 can be flexed over an angled surface with an angle of 90°.

To provide an effective gas flow through the laying die 12, wall surfaces 52 of the breakthroughs 34 comprise at least partially air-tight seals 54. Also, the carrier body surfaces 56 can be provided with these air-tight seals 54. The air-tight seals 54 can be formed by a glue-film 58 or by a silicon film 60.

Figure 7:
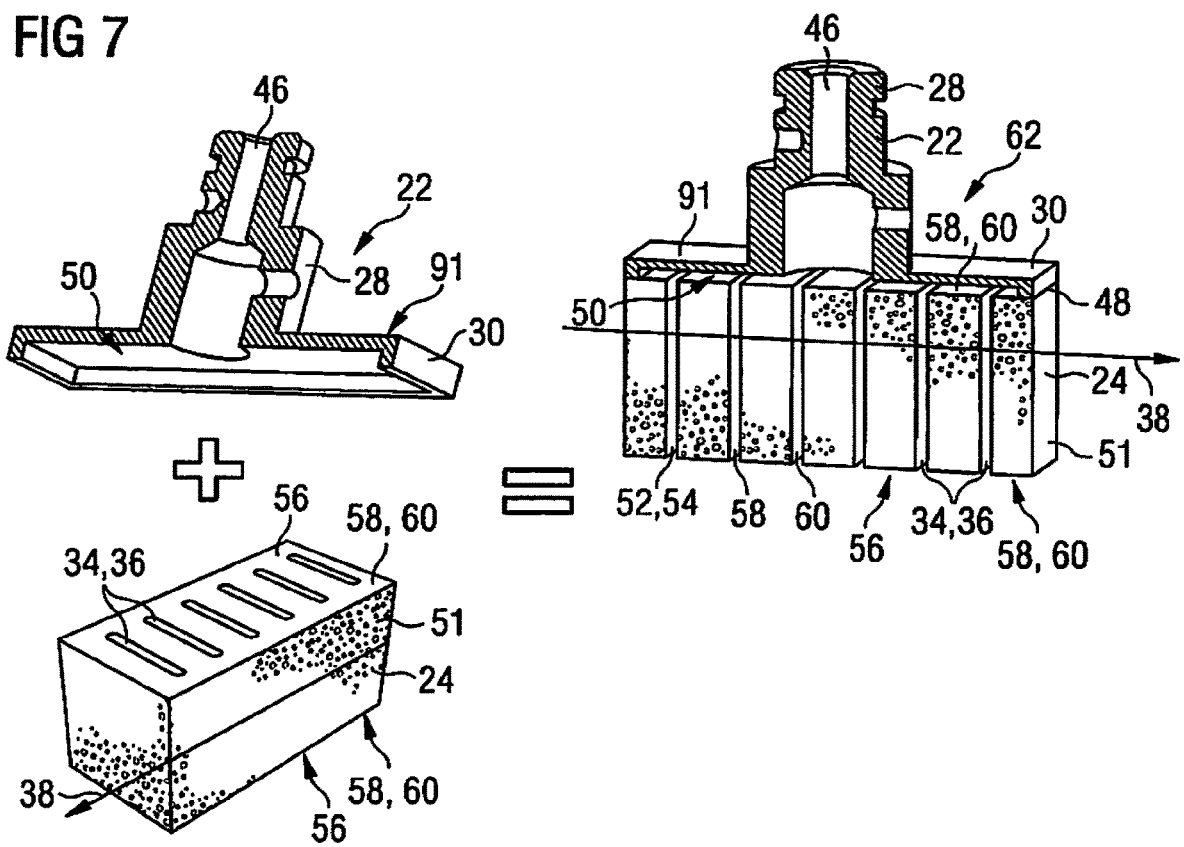
FIG. 7 shows the assembly of the attaching element and the carrier body of the laying die of FIG. 1 together with the resulting stiffness distribution according to FIG. 3.

FIG. 7 shows the assembly of the attaching element 22 and the carrier body 24 comprising the slits 36 to form an upper part 62 of the laying die 12, wherein this upper part 62 also comprises an evenly distributed stiffness. The evenly distributed breakthroughs 34 in the carrier body 24 can be provided by slits 36 as shown in FIG. 8 or by circles 64 which are arranged in a matrix 66, the matrix 66 comprising more than two rows and more than two columns as shown in FIG. 9. With a circle matrix the stiffness is not only distributed over the longitudinal extension direction 38 of the carrier body 24, but also over the extension direction in depth 68.

The substrate receiving structure 26 is formed from a distribution plate 70 as shown in FIG. 10. The distribution plate 70 comprises the two elastically deformable films 40, 42, each comprising evenly distributed holes 72. The heating element 44 is sandwiched between the two films 40, 42 and arranged on bars 74 between the holes 72. The holes 72 of the films 40, 42 are arranged correspondingly, i.e. the holes 72 of the upper film 40 are laying exactly over the holes 72 of the lower film 42. In FIG. 10 those films 40, 42 are formed from silicon and the heating element 44 is formed by a steel fiber made of thin steel filaments.

Figure 13:
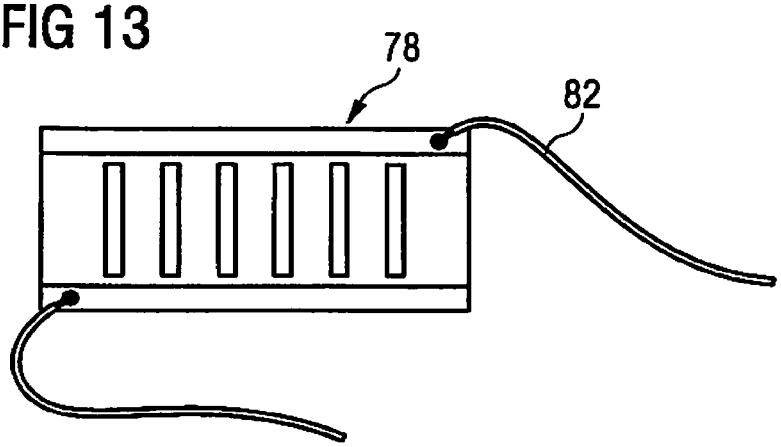
FIG. 13 illustrates a contact assembly to provide the coating as the heating element with a voltage.

FIG. 12 shows a backside view onto the distribution plate 70 with the heating element 44 in between the two films 40, 42. FIG. 13 shows a front side view of this distribution plate 70. FIG. 13 shows an alternative possibility to provide one or both of the films 40, 42 with a heating element 44.

Here, the heating element 44 is formed by a heatable coating 78, for example a graphite coating, which can be contacted via metal stripes. Therefore, one of the films 40, 42 is provided with those metal stripes and afterwards the coating 78 is provided on to film 40, 42 and metal stripes via rolling, spraying or brushing. Thereafter, the metal stripes can be provided with a voltage provided by contacting cables 82 to contact the metal stripes thereby heating up coating 78.

Figure 14:
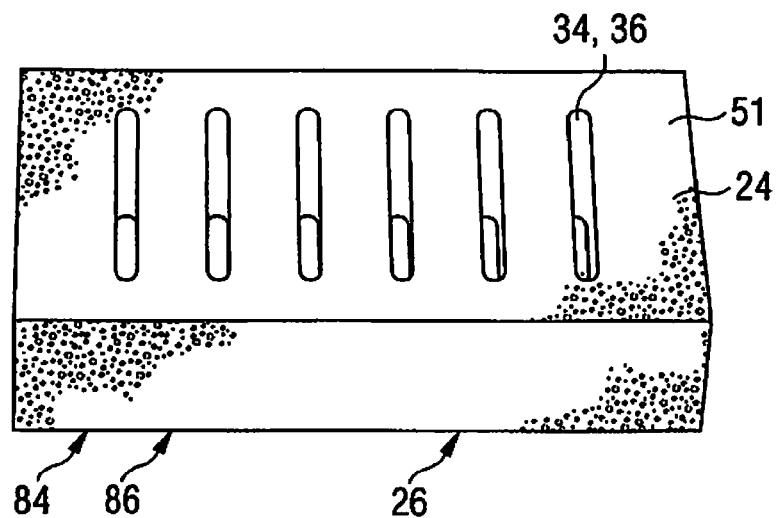
FIG. 14 shows an assembly of the carrier body and the substrate receiving structure viewed from above.
Figure 15:
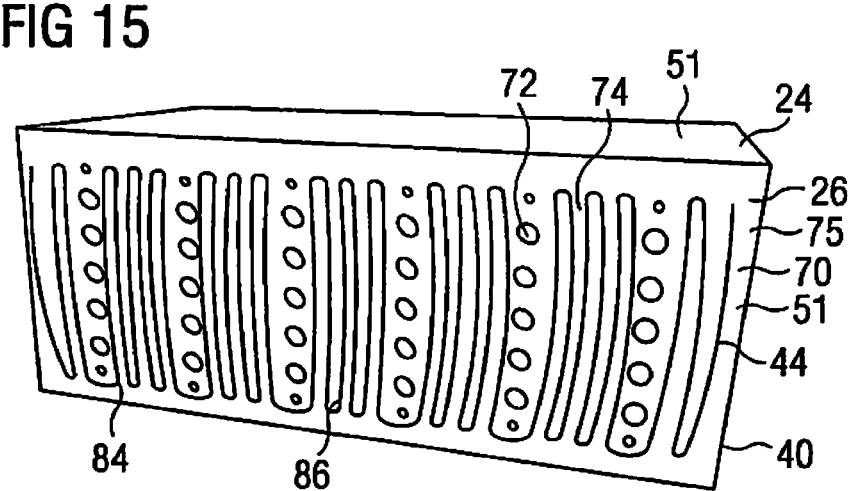
FIG. 15 shows the assembly of FIG. 14 viewed from below.
Figure 17:
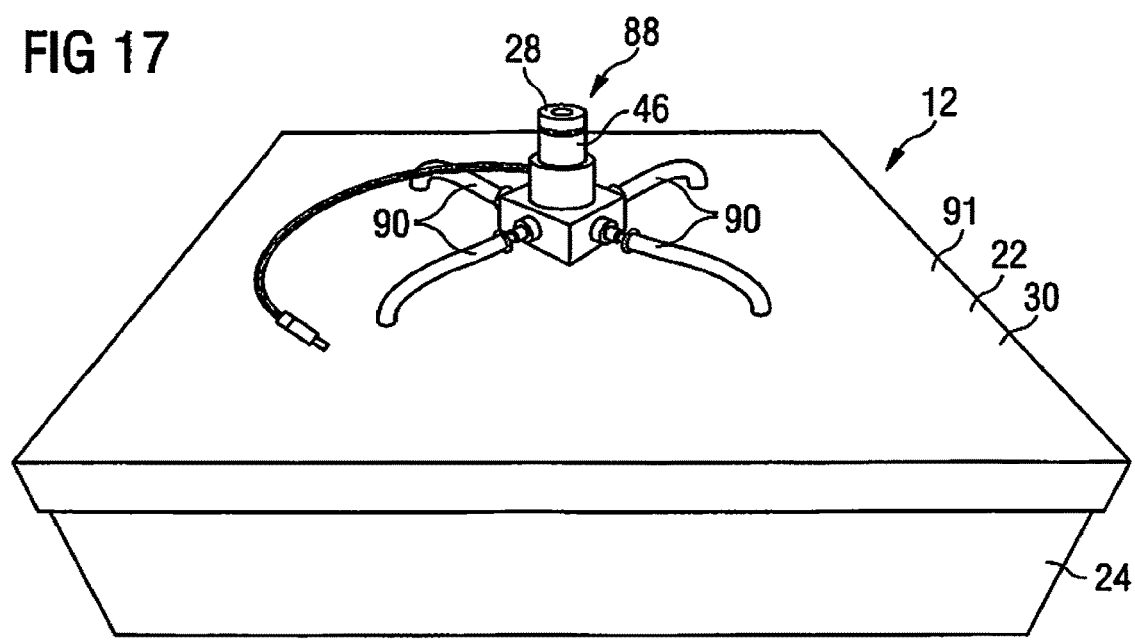
FIG. 17 illustrates an embodiment of the laying die comprising an attaching element with a second embodiment of a vacuum distribution system.

FIG. 14 and FIG. 15 show an assembly of the distribution plate 70 and the carrier body 24, wherein FIG. 14 shows a view from above onto the slits 36 in the carrier body 24 and FIG. 17 shows a view from below onto the distribution plate 70. The lower surface 84 of the distribution plate 70 which is directed away from the carrier body 24 provides an engagement surface of the substrate receiving structure 26 where substrates can be picked up.

Figure 16:
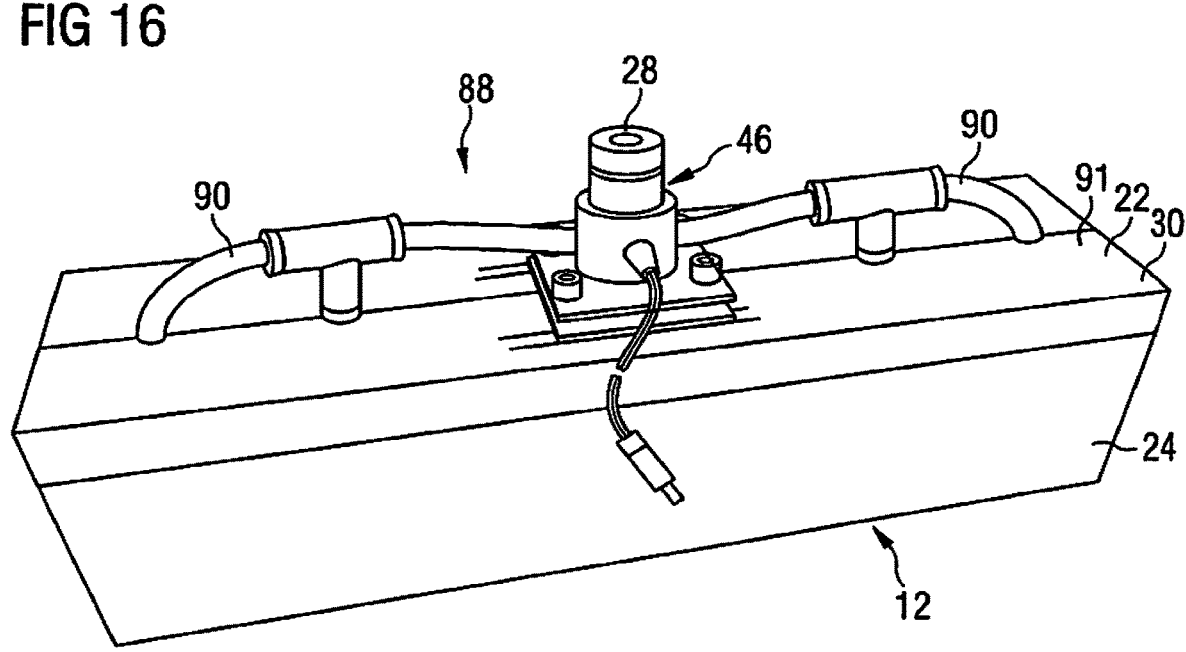
FIG. 16 shows an embodiment of the laying die comprising an attaching element with a first embodiment of a vacuum distribution system.

FIG. 16 and FIG. 17 show embodiments of the laying die 12 having a larger scale. Both embodiments comprise vacuum distribution systems 88 comprising a plurality of gas pipes 90 branching from the pipe element 28 over an upper surface 91 of the attaching element 22. In the embodiment of FIG. 16 only two gas pipes 90 are branching from pipe element 28. In the embodiment of FIG. 17 four gas pipes 90 are branching from pipe element 28. In case of large scaled laying dies 12 it is preferred to provide an attaching element 22 formed from a composite construction e.g. a carbon fiber reinforce polymer skin together with a Nomex® honeycomb core.

Figure 18:
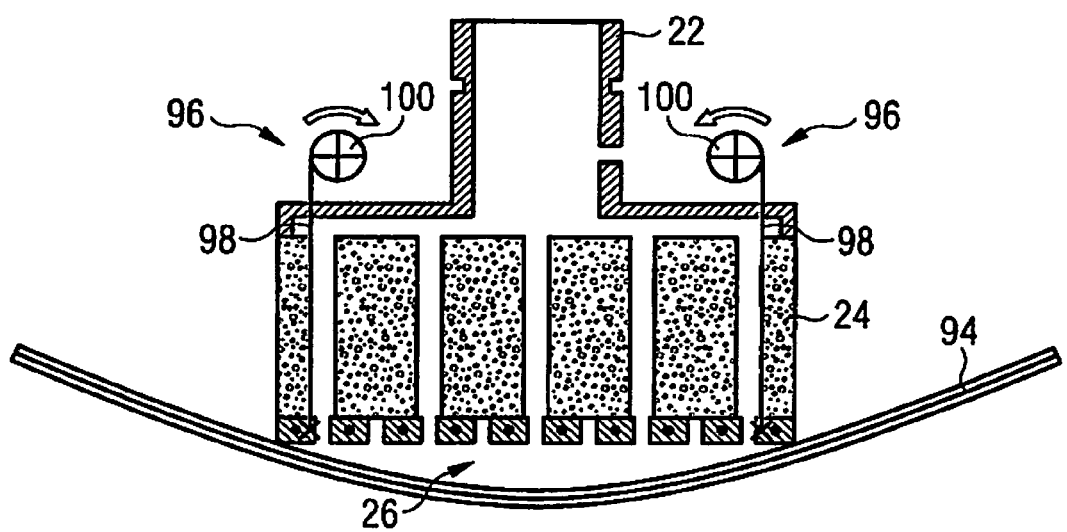
FIG. 18 shows the laying die of FIG. 1 comprising a cambering device and being in a non-deformed state.
Figure 19:
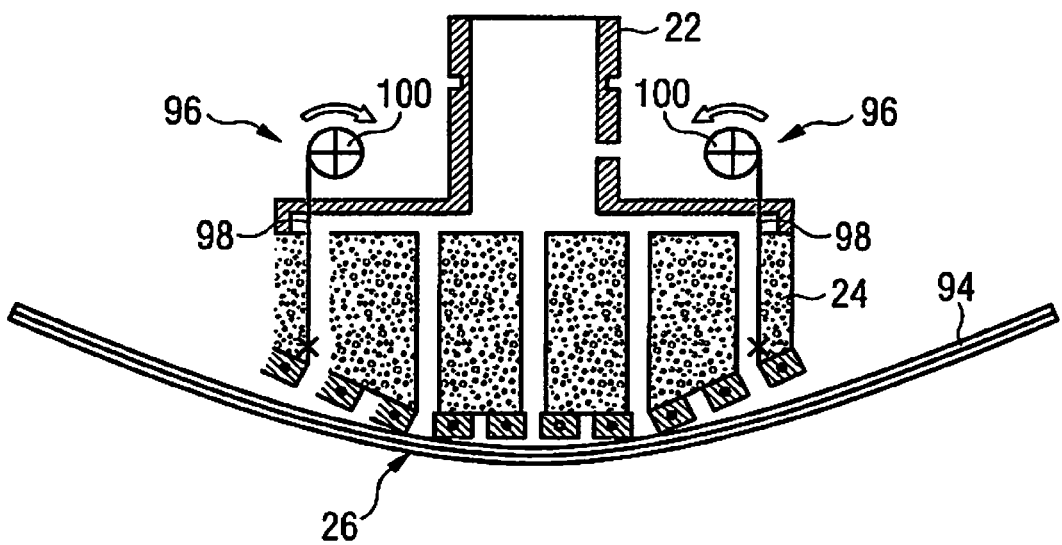
FIG. 19 shows the laying die of FIG. 18 in a cambered condition.

FIG. 18 shows the laying die 12 being provided with a cambering device 92 to actively camber the carrier body 24 and the substrate receiving structure 26. In FIG. 18 the engagement surface 86 of the laying die 12 is shown in a non-deformed condition relative to a predetermined camber 94, wherein in FIG. 19 the engagement surface 86 is in a cambered condition according to the predetermined camber 94. The cambering device 92 comprises a rope system 96 with a rope 98 and a bobbin 100. The rope 98 is arranged in the outermost breakthroughs 34 of the carrier body 24 and is attached to the substrate receiving structure 26.

Figure 20:
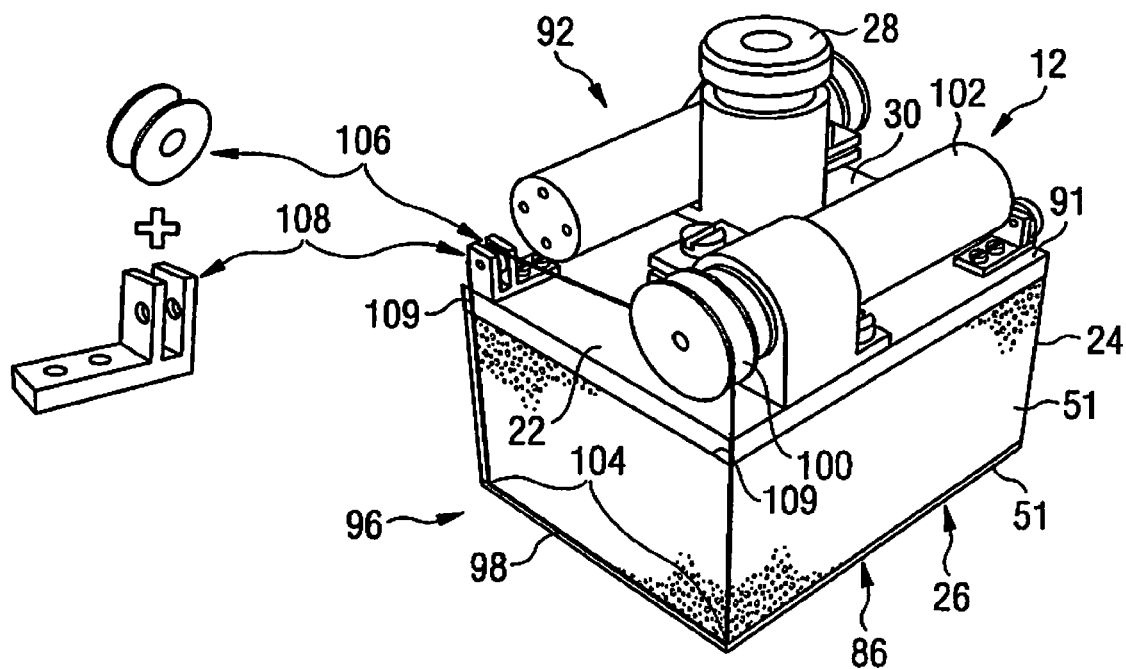
FIG. 20 shows a perspective view to the cambering device of FIG. 18.

FIG. 20 shows that the rope system 96 also comprises a motor 102, in particular a linear motor, to drive the bobbin 100. The rope 98 is guided in a square-like manner over bobbin 100, the opposing edges 104 of the carrier body 24 and an idler pulley 106 on a bearing 108, the idler pulley 106 and the bearing 108 being located at the vicinal edge 109 of the attaching element 22 to the bobbin 100. In FIG. 20 two rope systems 98 are provided for pulling opposing edges 104 of the attaching element 22.

Figure 21:
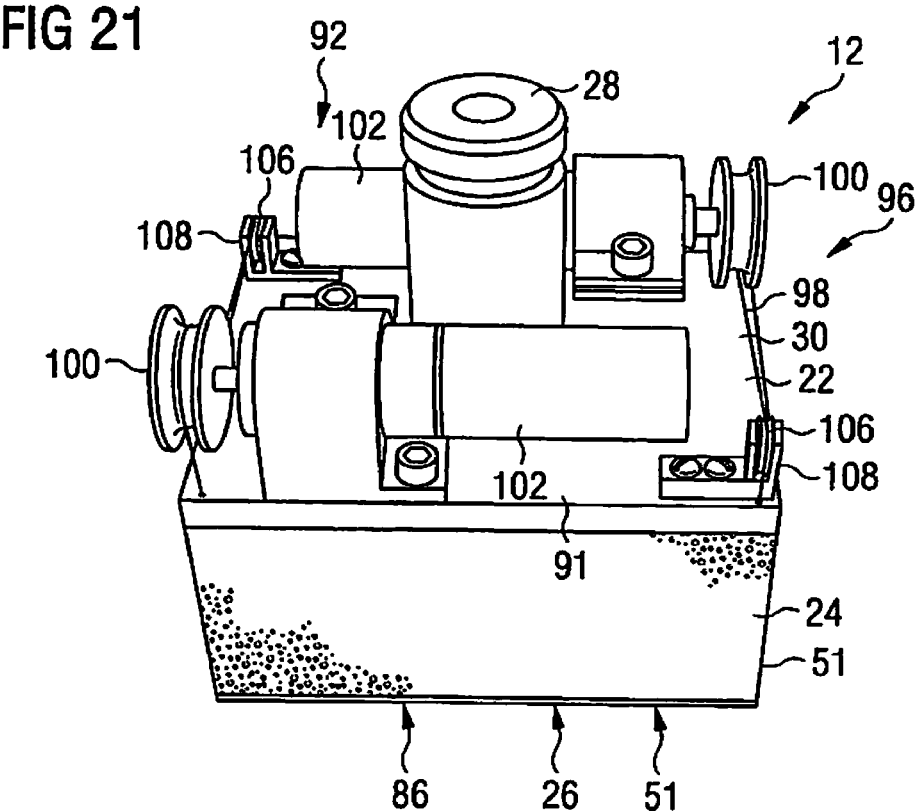
FIG. 21 illustrates a view from above on the cambering device of FIG. 18.
Figure 22:
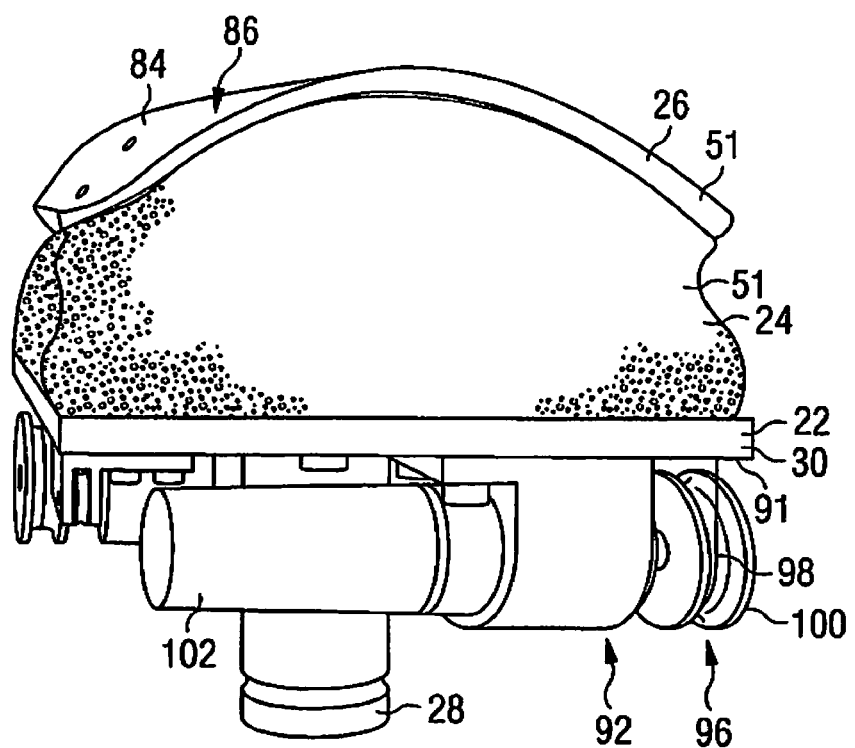
FIG. 22 shows a view to the cambered substrate receiving structure according to FIG. 19.

FIG. 21 shows a top view onto the laying die 12 comprising the rope system 96. FIG. 22 shows a view onto the carrier body 24 after being cambered by the rope system 96.

The above described robot head, i.e. laying die 12, enables the positioning of short fiber carbon patches of any position and orientation of the fibers during preforming. The head stamp, formed from the carrier body 24 and the substrate receiving structure 26, grabs a carbon patch, delivered by a feeder, using vacuum suction, place it on the tool according to the specified position/orientation and fixate it using thermally activated binder. The present invention enables to overcome the former deformability issues, as the head permits now the lay-up of complex 3D forms following the structure curvatures, radiuses and edges.

Heads according to the prior art had however some limitations:

Due to its design the head could not deform significantly and could just lay on slightly curved structures;

The head was quite sensitive: the thermocouple and/or the carbon fiber used for heating were breaking quite often;

The manufacturing required important effort;

The heating temperature was limited to ca. 80° C.;

It was difficult to adapt the concept for larger head sizes.

The present laying die 12 enables to overcome these former limitations and especially the deformability issues, as the die 12 permits now the lay-up of complex 3D forms following the structure curvatures, radius and edges.

In the following embodiment of the laying die 12 is described in comparison with the laying die 312 according to the prior art.

In the prior art die 312 there was a silicon tube, pipe 332, inserted into the foam of carrier body 324 to guide the vacuum from the metallic attaching element 322 to the silicon mat 338. The vacuum was then distributed in the silicon mat 338 (featuring an air distribution chamber) and then to the holes 344. This system was efficient but the stiffness of the silicon tube 332 was strongly reducing the deformability of the foam and therefore the carrier body 324.

In the embodiment of the laying die 12 there is a gas distribution chamber, hollow space 50, in the metallic inserts of the attaching element 22. The gas is then guided through the foam, i.e. through the tailored drilled breakthroughs 34 in the foam. The gas 45 is then coming out of the holes 72 of the heated sandwich structure 75.

This laying die 12 is efficient and the foam is now fully flexible and can adapt itself to complex contours. The foam is slightly permeable and in order to improve the vacuum guiding, the contour or surfaces of the carrier body 24 or wall surfaces 52 of the breakthroughs 34 can be partially or completely sealed with silicon, e.g. by gluing a silicon film 60 or simply using some glue 58 or by melting a thermoplastic film 60.

The breakthroughs 34 in the foam are not only for guiding vacuum but also for improving the deformability. Likewise the foam size and composition can be adapted to improve the flexibility. Specific breakthrough-design can improve the performance of the deformation, and the breakthrough-design can be adapted to specific requirements. The breakthroughs can be cutted (e.g. by knife, by laser, by water jet), drilled and/or burned.

In the laying die 12 of the prior art a carbon fiber was integrated via multi-step silicon casting in complex forms in order to create an heated silicon mat 338 with a gas distribution system. In the laying die 12 the heated sandwich structure 75 does not require to realise the gas distribution. The design is therefore simple and the heating fiber is simply glued, e.g. by a silicon glue, between two silicon films 40, 42 before the holes 72 are punched into it.

The asset of the preferred laying die 12 is that the manufacturing is much easier. The manufacturing does not require specific tool and can then be easily changed. Steel fibers are more efficient and can reach higher temperatures than carbon fibers. The steel yarns are made of thin filaments and are not as brittle as carbon fibers, that allows more flexibility and robustness of the die 12. Another heating system that can be used is a heatable coating 78, for example graphite coating, which can allow more efficiency for large surfaces.

The laying die 12 can easily be upscaled to manufacture larger heads. In that case it is preferable to foresee some adapted vacuum distribution systems 88. Also the use of a lighter design is preferable for the attaching element 22, e.g. a composite sandwich construction, with CFRP (carbon fiber reinforced polymer) with a Nomex® honeycomb core. For the lay-up of fibers on a concave surface, it is preferred to curve the carbon fibers according to the surface geometry before the lay-up in order to avoid fiber damages. Therefore it is preferred to have a die 12 which deforms the carbon material before the lay-up.

The laying die 12 preferably contains a rope system 96 integrated in the foam of the carrier body 24 and/or in the flexible layer of the substrate receiving structure 26. Deformation of the laying die 12 to a specific curvature can be realized using a bobin 100 connected to a rotating motor 102.

Some linear motors could also be used in combination with a similar rope system 96 in order to enable the deformation of the die 12. For this system it might be preferred to adapt the gas guiding through the foam of the carrier body 24 to concentrate the vacuum grip at the end of the fibers to be deformed.

What is claimed:

1. A method for manufacturing a laying die, comprising:
providing an elastically deformable substrate receiving structure with an elastically deformable distribution plate;
providing a carrier body made from an elastically deformable material;
providing an attaching element comprising a gas channel;
distributing a plurality of breakthroughs into the carrier body;
sandwiching the carrier body between the substrate receiving structure and the attaching element; and
providing a cambering device including a rope attached to the substrate receiving structure, wherein the cambering device configured to pull at least one of the carrier body and the substrate receiving structure into a predetermined deformation.

2. The method according to claim 1, wherein the providing the elastically deformable structure comprises:
providing two elastically deformable films;
arranging a heating element between the two elastically deformable films to provide a stack; and
distributing a plurality of holes into the stack.

\* \* \* \* \*